United States Patent [19]
Dell

[11] Patent Number: 6,044,479
[45] Date of Patent: Mar. 28, 2000

[54] HUMAN SENSORIALLY SIGNIFICANT SEQUENTIAL ERROR EVENT NOTIFICATION FOR AN ECC SYSTEM

[75] Inventor: Timothy Jay Dell, Colchester, Vt.

[73] Assignee: International Business Machines Corporation, Armonk, N.Y.

[21] Appl. No.: 09/015,134

[22] Filed: Jan. 29, 1998

[51] Int. Cl.$^7$ .................................................. G06F 11/00
[52] U.S. Cl. ........................... 714/48; 714/57; 714/763; 714/723
[58] Field of Search ................................... 714/48, 42, 39, 714/52, 54, 57, 43, 45, 47, 723, 763, 703, 773

[56] References Cited

U.S. PATENT DOCUMENTS

| | | | |
|---|---|---|---|
| 4,371,930 | 2/1983 | Kim ........................................... | 714/43 |
| 4,381,540 | 4/1983 | Lewis et al. ............................... | 714/54 |
| 4,761,783 | 8/1988 | Christensen et al. ..................... | 714/763 |
| 4,780,809 | 10/1988 | Woffinden et al. ........................ | 714/48 |
| 4,955,023 | 9/1990 | Tanimoto ................................... | 714/763 |
| 4,958,352 | 9/1990 | Noguchi et al. .......................... | 714/704 |
| 4,964,129 | 10/1990 | Bowden, III et al. ................... | 714/764 |
| 4,964,130 | 10/1990 | Bowden, III et al. ................... | 714/764 |
| 4,972,345 | 11/1990 | Munier et al. ............................ | 714/48 |
| 4,999,767 | 3/1991 | Durkin ....................................... | 714/57 |
| 5,068,851 | 11/1991 | Bruckert et al. .......................... | 371/16 |
| 5,428,630 | 6/1995 | Weng et al. .............................. | 714/763 |
| 5,577,201 | 11/1996 | Chan et al. ................................ | 714/57 |

*Primary Examiner*—Robert W. Beausoliel, Jr.
*Assistant Examiner*—Peter Kormanyos
*Attorney, Agent, or Firm*—Marc A. Ehrlich

[57] ABSTRACT

A method and apparatus are described for providing a human sensorially significant indication of the occurrence of a sequence of error events in an ECC system as they occur over time. Each error indication element is kept activated for a human sensorially significant ("HSS") time interval which is tracked by maintaining a count of refresh pulses received from a memory system. A HSS interval timer includes a D-type flip flop which pulses a binary counter for each refresh operation. The counter, when full, produces a reset signal. An error indication signal from an ECC system is provided to a error condition latch which activates a sensorial error indicator element if the error indication signal is provided to the latch while the memory system is performing a memory read operation. The latch is subsequently reset by the reset signal from the counter after a HSS interval has transpired. Further embodiments provide separate HSS indications for single and multiple bit errors as well as a static indication of the detection of an uncorrectable error.

23 Claims, 4 Drawing Sheets

HUMAN SENSORIALLY SIGNIFICANT SEQUENTIAL ERROR EVENT NOTIFICATION FOR AN ECC SYSTEM

CROSS-REFERENCE TO RELATED APPLICATIONS

The present invention is related and cross-reference may be had to the U.S. patent application assigned U.S. Ser. No. 08/984,240 entitled "ERROR CORRECTING CODE RETROFIT METHOD AND APPARATUS FOR MULTIPLE MEMORY CONFIGURATIONS" by Chen et al., assigned to the present assignee and filed on Dec. 3, 1997. This patent application is incorporated herein by reference.

FIELD OF THE INVENTION

The present invention is generally related to the field of computer system design, and particularly to the integration of a robust error correcting code mechanism into an existing computer system having one of a number of different memory configurations. More specifically, the invention relates to the integration of a mechanism within an error control system for providing a human perceptible sequential indication of the error detection or error correction activities thereof in a manner that is readily discerned by a human observer.

BACKGROUND OF THE INVENTION

A variety of factors including faulty components and inadequate design tolerances may result in errors in the data being processed by a computer. These errors also commonly occur during data transmission due to "noise" in the communication channel. As a result of these errors, one or more bits, which may be represented as X, which are to be transmitted within the system, are corrupted so as to be received as /X (i.e. the logical complement of the value of X). In order to protect a computer system against such errors, the data bits may be coded via error correcting code ("ECC") in such a way that the errors may be detected and possibly corrected by special ECC logic circuits. A typical ECC implementation appends a number of check bits to each data word. The appended check bits are used by the ECC logic circuits to detect errors within the data word.

The simplest and most common form of error control is implemented through the use of the parity bit. The single parity bit is appended to the data word and assigned to be either a 0 or a 1, so as to make the number of 1's in the data word even in the case of even parity codes, or odd in the case of odd parity codes.

Prior to the transmission of the data word in a computer system, often upon the initial storage of the data word, the value of the parity bit is computed at the source point and appended to the data word. Upon receipt of the transmitted data word, logic at the destination point recalculates the parity bit and compares it to the received, previously appended parity bit. If the recalculated and received parity bits are not equal a single bit error has been detected. Specifically, this means that a single data bit in the data word has transitioned from its original value, for example 1 to 0 or 0 to 1. If the received and recalculated parity bits are equal, then it can be concluded that such a single bit error did not occur, however multiple bit errors may not be ruled out. For example, if a data bit changes from a 0 to a 1 and another data bit changes from a 1 to a 0 (i.e. a double bit error) the parity of the data word will not change and the error will be undetected. Thus, use of the parity bit provides single error detection, however, it fails to detect every multiple even bit error, and it fails to provide information on the location of the erroneous bit(s).

By appending additional parity bits to the data word, each corresponding to a subset of data bits within the data word, the parity bit concept may be easily expanded to provide the detection of multiple bit errors or to determine the location of single or multiple bit errors. Once a data bit error is located it is a simple matter to cause a logic circuit to correct the located erroneous bit, thereby providing single error correction ("SEC"). Many single error correction codes have the ability to detect double errors and are thus termed single error correcting double error detecting codes ("SEC-DED").

Multiple error detection schemes rely on appending additional check bits to the data word. The most well-known SEC-DED ECC is the so-called Hamming code, which appends a series of check bits to the data word as it is stored in memory. Upon a read operation, the retrieved check bits are compared against recalculated check bits to detect, locate and correct a single bit error. By adding more check bits and appropriately overlapping the subsets of data bits represented thereby, other error correcting codes have been devised for providing three bit error detection and two bit error correction, and, via the further addition of check bits, codes can be formulated to detect and correct any number of data bit errors.

Robust error detection and correction systems have long been mandatory features on most large scale systems. Recently, the widespread adoption of the networked model of computing systems has heralded the emergence of a new role for the small to mid-sized PC heretofore intended for desktop applications; that of a network server. Concomitant with the adoption of this new computing model arose the need to provide greater assurances that the data being accessed by clients of these small to mid-sized servers was as accurate as the data on their larger system server counterparts. As a consequence, the industry began to provide error correction solutions for inclusion or retrofit into this new class of servers.

Manufacturers of these new ECC systems have encountered difficulty in demonstrating the benefits of this enhanced protection to prospective customers. Specifically, it has been determined that it is desirable to present some type of visual or other human perceptible signal to the observer indicative of the error detection and correction functions being undertaken by the ECC product.

Typically, the occurrence of an error detection or correction operation in an ECC system occurs at the same time that the erroneous data is needed. Consequently, utilizing current technology a typical error event is completed in approximately 50 nanoseconds, and as semiconductor technology advances, the time required for such an operation is continually growing shorter. The notification of these ECC events within event recording systems operate at commensurate speeds with similarly fast hardware logic recording the error event so as to permit that record to examined later at human speeds i.e. on the order of seconds rather than nanoseconds. Clearly, if a visible error indicator element such as a light emitting diode ("LED") or display circuit were activated only for the occurrence of the memory cycle in which it occurred, the human eye could never detect it. Consequently, the aforementioned event recording systems accomplish the objective of allowing an observer to visually perceive a single error event.

For example U.S. Pat. No. 5,068,851 to Brucker et al. discloses a fault recording system wherein the occurrence of a fault is stored by non-volatile memory and presented to the observer by means of a visible indicator.

The simple latching or recording of a single error event, however, does not afford the observer the ability to appreciate via a visual indication, the occurrence of plural temporally sequenced error events unless the system were continually manually reset or a large number of error indicators were employed, each latching a single error event as it occurred, both of these are impractical and possibly cost prohibitive alternatives. Without the practical ability to visually or otherwise demonstrate the operation of an ECC system over time as it detects and corrects a plurality of errors and signifies uncorrectable errors in data from a memory subsystem it is difficult to accurately convey to an observer the function being performed by the system.

Accordingly, a need exists for the provision of a human sensorially significant ("HSS") indication of error detection and/or correction and the detection of uncorrectable errors by an ECC system automatically on a recurring basis without requiring an excessive number of error indicators.

SUMMARY OF THE INVENTION

The foregoing problems and shortcomings of the prior art are overcome and further advantageous features are provided by the present invention which teaches a method and apparatus for implementing a human sensorially significant ("HSS") indication of the temporally sequential function of an ECC system. With such an implementation an observer would be afforded the opportunity to perceive the plural sequential error events undertaken by an ECC system including without limitation, single bit and multiple bit error detection, single bit and multiple bit error correction and uncorrectable error detection.

In an embodiment of the invention, one or more error indicator elements which may be any electrical circuits capable of creating a visually perceptible signal such as display circuits or preferably light emitting diodes ("LEDs"), or which alternatively may be elements capable of producing other human perceptible signals, are activated via logic circuitry which may be coupled to an ECC system. The indicator elements are activated for a HSS period of time by way of an error condition latch which is then automatically reset after a HSS period so as to be ready to human sensorially significantly indicate subsequent error events within the ECC system.

In a particular embodiment of the invention a HSS interval timer counts a number of memory refresh pulses received by the SIMM or DIMM included in the ECC system, wherein an accumulated number of pulses corresponds to a HSS time interval. The error condition latch is set so that the error indicators remain activated for the HSS duration of the count after which the error condition latch is reset and is available for the next occurrence of an error condition.

The error condition latch is coupled to associated logic for ensuring that an error event has occurred in the ECC system during a memory read operation and for maintaining the state of the latch for the HSS interval.

In a further embodiment a mechanism is provided to enable the observer to perceptibly distinguish between single and multiple bit error events. Specifically, the embodiment teaches the inclusion of plural visible indicator elements each corresponding to a different number of erroneous bits which are being detected and/or corrected by the ECC system. These plural error indicator elements are each coupled to separate error condition latches which enable their separate respective activation so as to display not only error events over time, but more particularly distinct varieties of error events over time within the ECC system.

In yet another embodiment of the invention a mechanism is provided to statically indicate the detection of an uncorrectable error, including means to disable the resetting of the error condition latch via the HSS interval timer, until a power-on reset operation is performed.

The present invention is preferably coupled to a retrofit ECC system such as the ECC on DIMM system forming the subject matter of U.S. patent application Ser. No. 08/984, 240 entitled "ERROR CORRECTING CODE RETROFIT METHOD AND APPARATUS FOR MULTIPLE MEMORY CONFIGURATIONS" by Chen et al., assigned to the present assignee and filed on Dec. 3, 1997. This application is incorporated herein by reference.

BRIEF DESCRIPTION OF THE DRAWINGS

The subject matter which is regarded as the invention is particularly pointed out and distinctly claimed at the conclusion of the specification. The foregoing, as well as other features and advantages of the invention will be apparent from the following detailed description in conjunction with the accompanying drawings, in which:

DETAILED DESCRIPTION OF THE PREFERRED EMBODIMENTS OF THE INVENTION

The emerging role of the small to mid-sized PC-based server as a standard element of a networked enterprise has moved such relatively small computer systems, heretofore intended for advanced desktop uses, into the role of the network server, storing data to be accessed by numerous users throughout an enterprise. As the number of users accessing this new type of server has grown, so has the requirement of ensuring the integrity of the data stored therein. Accordingly, the need to upgrade the ECC in existing computer systems in order to detect and correct multiple data bit errors including those multiple data bit errors caused by the failure of an entire single DRAM chip, has recently become an important consideration of network system owners. Consequently, retrofit ECC hardware mechanisms which permit mid-range server owners to enhance the data integrity of their low-end servers have become increasingly popular.

In order to properly demonstrate the advantages provided by the operation of such retrofit ECC mechanisms it has been found that a visual or other human perceptible exhibition of the ECC most effectively conveys the functionality to an observer. Accordingly, it is desirable to afford a potential customer the means to visually or audibly perceive the temporally sequential error detection and correction and uncorrectable error detection events undertaken by the ECC system. Heretofore, however, error indication solutions were based upon storing an error event for subsequent display to the user, and as such did not permit an observer to appreciate the functionality of the ECC system over time. The present invention offers a solution to this problem by providing a HSS indication of a sequence of error events in an ECC system as they occur over time. While our preferred embodiment will focus on the provision of an optically significant indication of ECC events it will be understood that other types of human perceptible indications such as audible, tactile or olfactory indications could be enabled via the same techniques and are therefore considered to be within the scope of the present invention.

Figure 1:
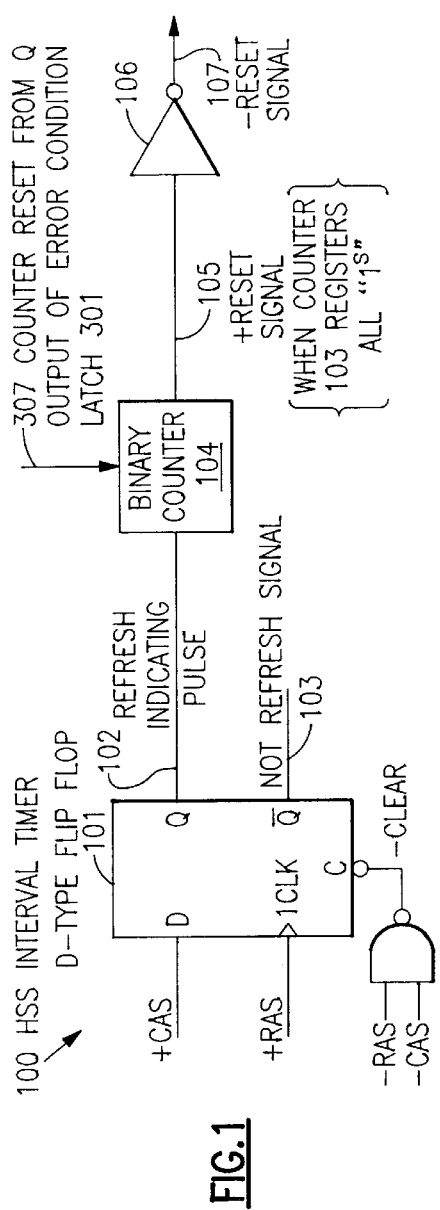
FIG. 1 illustrates the HSS interval timer mechanism.

Turning now to our invention in greater detail, reference may be had to FIG. 1 wherein a HSS interval timer 100 including a typical D-type edge triggered flip flop 101 is depicted. As previously noted the duration of an error event within an ECC system does not lend itself to a real time humanly perceptible visual display. Accordingly, the HSS interval timer 100 provides a mechanism for clocking a HSS time interval for visibly displaying these error events.

Since industry standard SIMMs and DIMMs do not include real time clock signals with which to count a HSS interval for activating an error event indicator, it is preferable to utilize signals that are received by these memory cards to accomplish this function. Accordingly, the present invention makes use of the column address strobe ("CAS") and row address strobe ("RAS") signals received by the memory cards to provide a "clock" pulse for each memory refresh operation undertaken by the memory chips on the card.

In industry standard memory systems the dynamic random access memories ("DRAMs") are refreshed utilizing a CAS before RAS ("CBR") sequence of pulses wherein the CAS signal transitions to a low logic level before the RAS signal. This CBR sequence is readily distinguishable from the RAS before CAS ("RBC") sequence used in normal memory operations such as reading and writing functions, and consequently the D flip flop 101 is designed to provide a high-going pulse 102 upon the occurrence of a CBR memory refresh operation to enable the clocking of a HSS interval by the HSS interval timer 100.

The current specification for a typical full-power DRAM refresh is on the order of 2K refreshes in a 32 ms interval or 4K refreshes in a 64 ms interval or alternatively 8K refreshes in a 128 ms interval. This equates to a single refresh operation every 15.6 us. Current DRAMs alternatively provide for refresh operations to be conducted in a "burst mode" wherein the refresh operations are conducted in a back-to-back fashion rather than spread out over 15.6 us intervals, however for purposes of the present invention it will not matter which type of refresh mode is utilized to accommodate the timing of a HSS interval for activating error indicators so as to signify error events in the ECC system.

The refresh pulse clocking flip flop 101 of the HSS interval timer 100 serves as a substitute for a real time clock signal for setting the HSS time period for illuminating an human perceptible error indicator such as an LED or a display circuit.

Referring again to FIG. 1 we can see that the D input on the flip flop 101 receives the +CAS signal which exhibits a logic state which is the complement of the system CAS signal (or −CAS) while the clock input receives the +RAS signal which exhibits a logic state which is the complement of the system RAS signal (or −RAS). The Q output of the flip flop transitions to a high logic level upon the detection of a CBR sequence to provide a high going pulse signifying the initiation of a refresh operation 102 as will be subsequently described. The /Q output provides the logical complement of the Q output, and accordingly this output transitions to a high logic level to signify that a CBR refresh is not taking place 103 (i.e. it indicates normal memory operations undertaken via RBC sequences). The flip flop 101 is reset so as to enable subsequent sampling of new states of the +CAS and +RAS signals when system RAS and CAS (i.e. −RAS and −CAS) are at a high logic level.

In accordance with the illustration of the D-type flip flop 101 within the HSS interval timer 100 it will be understood that a pulse 102 will be generated upon the initiation of each CBR refresh, which occurs approximately every 15.6 us. This refresh indicating pulse 102 will be passed to a binary counter 104 which increments upon receipt of each refresh indicating pulse 102. The counter 104 will have the capacity to record a number of refresh indicating pulses 102 corresponding to a HSS interval.

A minimal optically perceptible duration for a given event is typically on the order of tenths of seconds rather than milliseconds, and as such an exemplary embodiment of the invention will include a fourteen bit binary counter 104 which will record $2^{14}$ or 16,384 refresh pulses from flip flop 101 which, at a base interval of 15.6 us per successive refresh operation, equates to a time interval of 256 ms or 0.256 s, a HSS interval for a visual indication. Of course it will be understood that a counter 104 may be selected which will count any interval of time that is deemed significant for purposes of the indication whether it is a visual or audible or other human perceptible indication that is desired. After the binary counter 104 counts the 16,384 refresh pulses it will send a reset signal 105 through inverter 106 creating a—reset signal 107. These reset signals are used to reset a latch which activates a coupled error indicator element upon the occurrence of an error event within the ECC system, the reset occurs at a HSS interval after the error event has elapsed as will be subsequently described herein.

Figure 2:
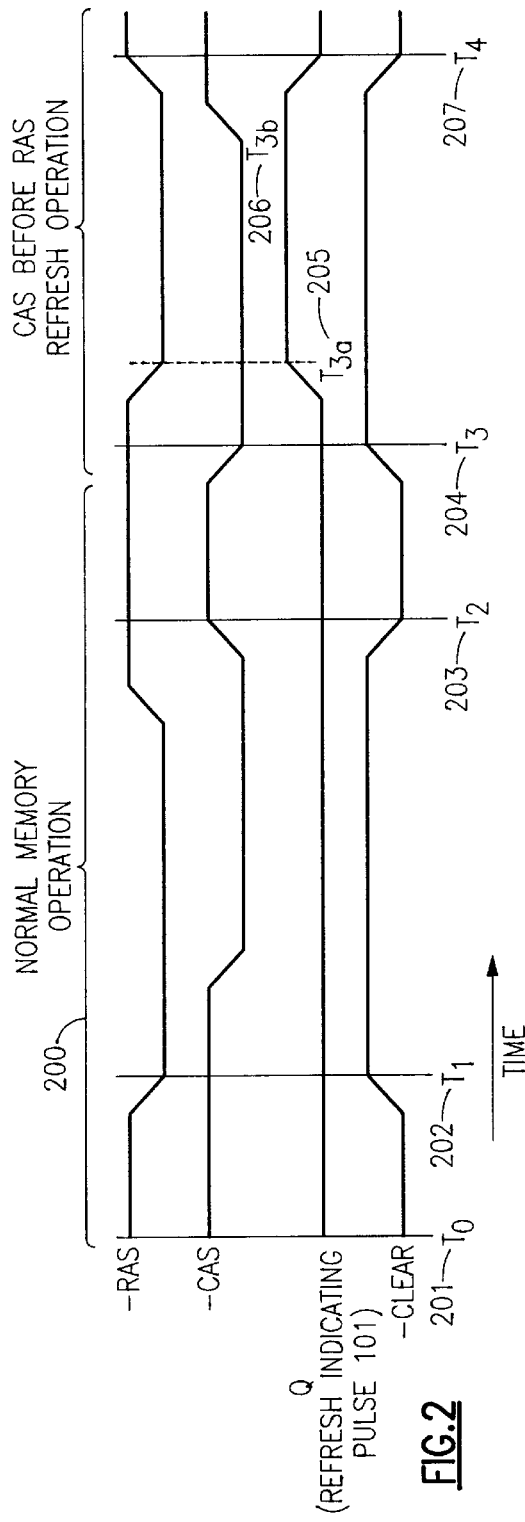
FIG. 2 depicts a timing sequence for the HSS interval timer.

In order to better understand the timing operation of the HSS interval timer 100 it will be instructive to consider the timing diagram 200 shown in FIG. 2. The timing diagram 200 illustrates operation of the flip flop 101 by diagramtically presenting the transitions of the outputs Q (the refresh indicating signal 102) and accordingly by implication /Q (the not refresh indicating pulse 103 which is the logical complement of the Q signal) of flip flop 101 as well as the reset C input thereof as a function of the transitions of the system CAS (−CAS and the system RAS (−RAS) signals.

In accordance with the timing diagram 200 it can be seen that at time T0 201 where system RAS (−RAS) and system CAS (−CAS) are both at a high logic level (and correspondingly where +RAS and +CAS are at low logic levels) the clear signal (an active low signal) is at a low logic level, so that the flip flop 101 is being cleared and is not sampling the +RAS signal at the clock input. Accordingly, the refresh indicating signal 102 at output Q is kept at a low logic level (and correspondingly the not refresh signal 103 at /Q (not shown) is high).

At time T1 202 system RAS transitions from a high logic level to a low logic level and correspondingly the active low clear signal transitions from low to high thereby enabling the sampling of the flip flop 101 inputs. The system CAS signal is high at time T1 when +RAS goes high, and accordingly the +CAS signal at the D input of flip flop is low indicating that a RBC (RAS before CAS) sequence has transpired and that no refresh is occurring. As a result the flip flop 101 continues to output a low logic level at the Q output correlating to a low refresh indicating signal 102 which will not increment counter 104 and a high logic level at the /Q output indicating a high not refresh indicating signal 103. This timing sequence is indicative of normal memory access operations such as memory read and write operations.

Next at time T2 203, the system RAS has previously transitioned to a high logic level and the system CAS completes a transition from a low to high logic level which in turn enables the clear input by forcing the clear signal low. The flip flop 101 is thus cleared and sampling of the inputs suspended with the output Q remaining at a low logic level.

At time T3 204, the system CAS transitions to a low logic level which in turn forces clear signal high and the flip flop 101 is once again permitted to sample input signals. Shortly after T3 (at time T3a 205) the system RAS transitions from its high logic state to a low logic state and upon the corresponding upward transition of +RAS the flip flop 101 samples the state of the +CAS signal which has previously toggled to a high level as of T3, hence a CAS before RAS refresh sequence is detected and the output Q corresponding to the refresh indicating signal 102 transitions from a low to high logic level incrementing binary counter 104 by 1. Thereafter, at time T3b 206 system CAS again transitions from a low to high logic level.

Finally, at T4 207 system RAS transitions from a low to high logic state. Since system RAS and CAS are both at logic high levels at this point, the clear signal is forced low and the flip flop is cleared toggling the refresh indicating output 102 at Q to a low logic state and preparing for subsequent sampling of the inputs.

In accordance with the foregoing timing diagram 200 it will be understood that the HSS interval timer 100 via operation of the d-type edge triggered flip flop 101, provides a sequence of refresh indicating pulses 102 to the binary counter 104 upon the performance of a CBR refresh, until the counter is full (i.e. 16,384 refresh pulses * 15.6 us between pulses=0.256 seconds for a 14 bit binary counter) at which point the reset signal 105 is output from the counter through inverter 106 to create the—reset signal 107 and the counter 104 is zeroed out.

Having described the operation of the HSS interval timer 100 we will now consider the operation of a HSS error indication apparatus for coupling to and indicating error events in single and multiple bit error control systems which may be performing error detection or error detection and correction. For purposes of illustration our examples involving single and multiple bit error control systems will describe error correction systems however the implementation for error detection indication is substantially identical.

Figure 3:
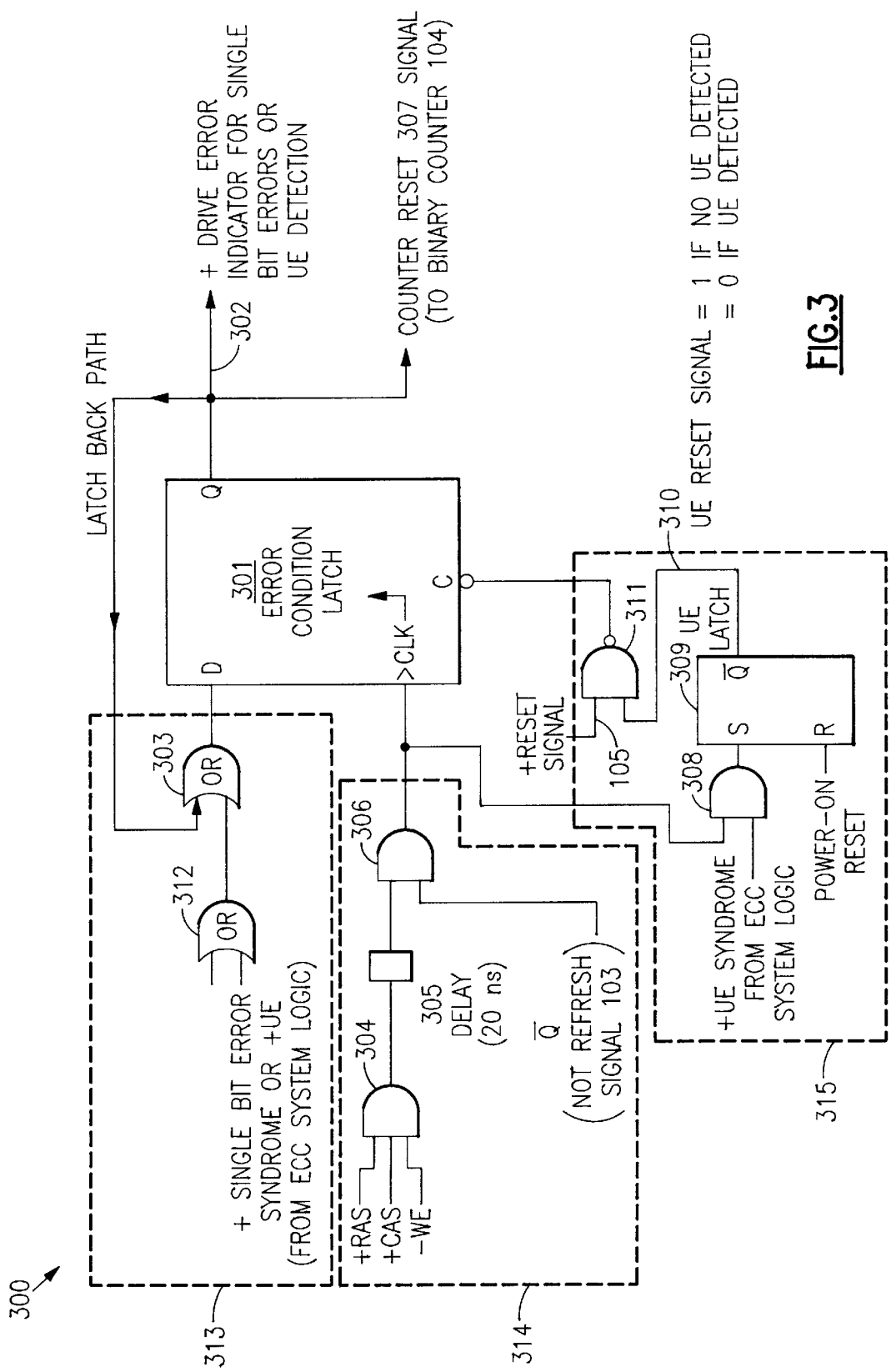
FIG. 3 illustrates a HSS error indicator system for indicating error events in an SEC ECC system including means for dynamically indicating single error correction events and statically indicating uncorrectable error detection events.

Turning to FIG. 3, a system 300 for accomplishing HSS error indication in a single error correcting ECC system is shown. In particular, system 300 represents a HSS error indicator system for indicating error events in a SEC ECC system including means for dynamically indicating a sequence of single error correction events and statically indicating uncorrectable error detection events. In system 300 another D-type edge triggered flip flop serves as the error condition latch 301 which provides a signal 302 from output Q to activate an error indicator element for the HSS period timed by the HSS interval timer 100.

The error condition latch 301 is coupled to the ECC logic of the SEC ECC system to provide human perceptible evidence of its functionality. The D input of the latch 301 receives as input a single bit error syndrome signal from the ECC logic as well as a UE (uncorrectable error detection) syndrome for uncorrectable errors (if the ECC system includes such a feature). These ECC signals indicate respectively the detection and correction of a single bit error and the detection of an error which the ECC system is incapable of correcting. (The generation of such ECC syndrome signals is well understood by those of skill in the art for further information on the subject reference may be had to the related application entitled: "ERROR CORRECTING CODE RETROFIT METHOD AND APPARATUS FOR MULTIPLE MEMORY CONFIGURATIONS" by Chen et al., filed as U.S. Ser. No. 08/984,240 on Dec. 3, 1997, assigned to the present assignee and incorporated herein by reference, as well as the application entitled "ERROR PROPAGATION OPERATING MODE FOR ERROR CORRECTING CODE RETROFIT APPARATUS" by Chen et al., filed as attorney docket number PO9-97-0185 concurrently with this application, assigned to the present assignee and incorporated herein by reference, each of which details various aspects regarding the design and operation of a multiple bit (chipkill) error detection and correction retrofit ECC system including the provision for detecting and signalling the detection of UEs.) The input of these signals into the error condition latch 301 is provided via their combination in OR gate 312.

The error condition latch 301 receives the error indication syndrome signals from the ECC logic system from OR gate 312 through OR gate 303 which additionally receives the latched back output signal Q 302 of the error condition latch 301. This feedback path permits the latch 301 to continually output a high logic level to drive an error indicator element for a HSS interval until the latch is reset. The signals from the ECC logic, when indicating the occurrence of an error event, transition back to a logic low level after approximately 50 ns (a non-HSS interval for a visual indication). The feedback path for signal 302 permits the high logic level, output from the error condition latch 301 upon the occurrence of the error event, to be fed back to the latch as an input so as to maintain the high logic level. Correspondingly, the error condition latch 301 will continue to drive the coupled error indicator element until the latch 301 is reset by the reset signal 105 which is generated by binary counter 104 after a HSS interval has transpired and which is provided to the active low C input of the latch 301 through NAND gate 311 as will be subsequently further described.

Accordingly, the OR gate 312 along with OR gate 303 together with the feed back path latching the output Q of the error condition latch 301 provide what will be referred to as the error event detection and communication logic 313 for system 300. The error event detection and communication logic 313 functions by providing the error condition latch with an indication that an error event has transpired within the ECC system for which it is required to activate the error indicator element for a HSS interval.

In order to ensure that the latch 301 properly registers the occurrence of an error event (i.e. a single bit error syndrome or UE syndrome in system 300) the memory system must be involved in a normal memory read operation, since the ECC logic operates on data to determine the presence of errors as it is being fetched from memory. Error indications provided by the error event detection and communication logic 313 during refresh or memory write operations do not accurately indicate the function of the ECC system and may not relate to an actual error event therein. Accordingly, the +RAS and +CAS and system write enable signals (-WE) are provided as input to AND gate 304. When +RAS and +CAS are high (i.e. system RAS and CAS are low) and system write enable is high the memory system is either refreshing the DRAMs if the +CAS has toggled high before the +RAS (i.e. CBR refresh) or reading data from the DRAMs if the +RAS toggled high before the +CAS (RBC operation). In order to further ensure the state of the logic on the ECC system logic lines for single bit error syndrome or UE detection syndrome, a delay circuit 305 is provided to delay the passage of the output of AND gate 304 until the ECC system has had sufficient time to access data from the DRAMs and pass the accessed data through the ECC logic to correct any single bit errors or detect any uncorrectable errors therein. In a preferred embodiment a 20 ns delay would provide sufficient time for the signals on the ECC syndrome lines to stabilize.

Since the AND gate 304 may produce a high logic level output during refresh or read operations the output of delay 305 is next input into AND gate 306 along with the not refresh signal 103 generated by the /Q output of flip flop 101. It will be recalled that the not refresh signal 103 will exhibit a high logic level only during normal memory operations (RBC transitions) and a low logic level during refresh operations CBR transitions). Thus, since AND gate 304 will produce a high level output only when the memory system is refreshing or reading data and since not refresh signal 103 will only exhibit a high level when the memory is not being refreshed, the output of AND 306 will only be high when the memory system is performing a read operation. The output of AND 306 is provided to the clock input of the error condition latch 301 such that a high going pulse will cause the error condition latch to sample the input D upon a memory read operation. The input D will be a stable high logic level if an error event took place during the memory read operation. This high level input will be then passed as output signal 302 via latch output Q to drive the error indicator element and provided as a latch back input to the D input of the latch through OR gate 303. Accordingly, from a functional standpoint, the AND gate 304 together with the delay 305 and AND gate 306 perform the operations for determining the occurrence of a read operation and for providing time for any error event occurring in the ECC system during the read operation to stabilize at OR 312. Consequently, the functional unit will be referred to as the read determination logic unit 314.

As previously noted the latch output signal 302 is fed back through OR gate 303 into the latch input D to maintain the high logic state after the ECC system lines have toggled low. The reset signal 105 which is generated via the overflow of the counter 104 in the HSS interval timer 100 after (for example) 0.256 seconds resets the latch 301 thereby deactivating the error indicator element. Thereafter, upon a subsequent memory read operation, the latch 301 will once again sample the input signals. Accordingly, upon the occurrence of an error event within the ECC logic, specifically, the correction of a single bit error, the error indicator element is activated for a HSS interval of time by the error condition latch 301.

It will be understood that where, for demonstration purposes, it is desired to illustrate the operation of the ECC system on a continuous sequence of errors, such as would be produced by manually shorting out one of the DQ data lines on a DRAM, each sequential sampling of the latch 301 inputs would produce a new single bit error signal which in turn would drive the error indicator for correspondingly sequential HSS intervals until the short is removed. The counter reset signal line 307 couples the logic state of the Q output 302 of the latch 301 to the active low reset input of the binary counter 104 so as to ensure that each error event is latched (and therefore drives the error indicator) for precisely one HSS period.

Upon the occurrence of a UE detection by the ECC system, the HSS function of the error condition latch 301 is disabled and the error indicator element remains activated until the a power-on reset operation is performed, thus the system 300 provides a static indication of a UE detection.

In order to describe this operation in detail we will further examine FIG. 3 wherein we see the functional depiction of the HSS disabling logic 315. The HSS disabling logic 315 functions by receiving the output of AND gate 306 (which it will be recalled indicates that the memory system is performing a read operation and which is delayed by delay unit 305 to account for DRAM access and ECC logic operations) along with the +UE syndrome into AND gate 308. The high logic state of the +UE signal indicates the detection of an uncorrectable error by the ECC system. The output of AND 308 is provided to the input of the UE latch 309 a typical set/reset type of latch. When a UE has not been detected the +UE signal will be at low logic levels, likewise the output of AND 306 will only transition high after the delay interval has occurred subsequent to a memory read operation. Consequently, unless both of these conditions are met the AND 308 outputs a low logic state and the UE latch 309 outputs a high logic level UE reset signal 310 from the output /Q.

The UE reset signal 310 is input into NAND gate 311 along with the reset signal 105 from the counter 104. Thus, when a UE has not been detected and the reset signal 105 toggles high, the NAND 311 outputs a low logic level and error condition latch 301 is reset, and correspondingly when the reset signal 105 is low, the NAND 311 outputs a high logic level which does not reset the latch.

Upon the occurrence of a UE detection, the UE reset signal 310 toggles to a low level which forces the output of the NAND 311 toggle to a high logic state which in turn prevents the latch 301 from being reset, thereby disabling the HSS interval function and providing a continuous indication from the error indicator element. This static indication remains in place until a power-on reset toggles the UE reset signal 310 from UE latch 309 to a high logic level which once again enables the HSS interval function of the latch 301.

Figure 4:
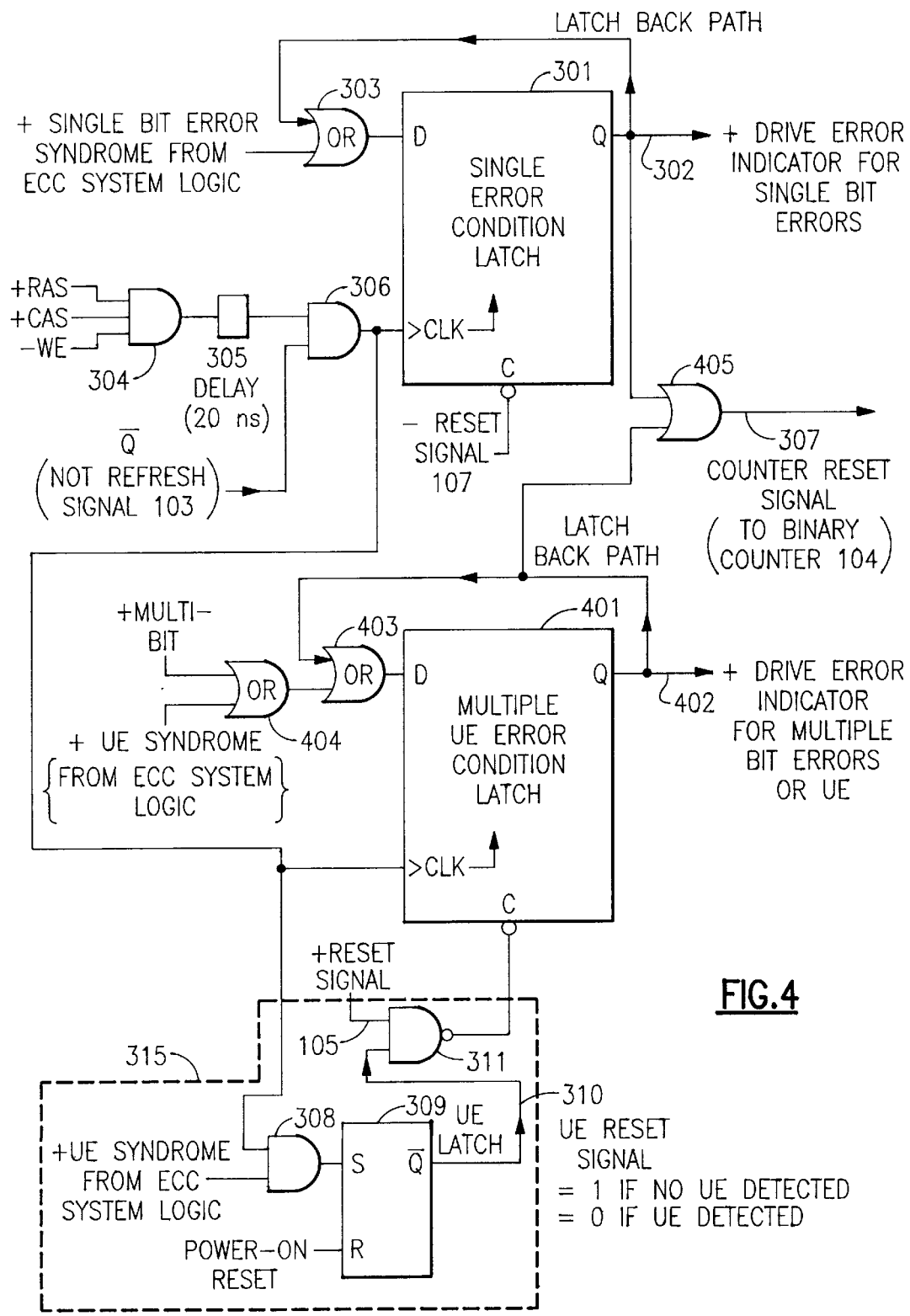
FIG. 4 illustrates a HSS error indicator system for separately dynamically indicating single error correction events, and multiple error correction events as well as for statically indicating uncorrectable error detection events.

In a further embodiment of the invention depicted as system 400 in FIG. 4, an additional error condition latch 401 is incorporated into system 300 so as to enable the separate HSS dynamic indication of single bit error events and multiple bit error events within an ECC system while additionally enabling the previously described static indication of UE detection feature. The system 400 functions in a manner that is substantially identical to system 300 however the inclusion of the additional error condition latch 401 permits the activation of a separate error indicator element coupled to the additional latch 401 in the event that the ECC system performs a multiple error correction/detection operation (in the illustrated embodiment the UE detection indication feature is provided via the latch 401 and associated logic instead of latch 301 in system 300). In this enhanced system 400 the error condition latch 401 includes the same feed back path from the latch output signal 402 from output Q back to OR gate 403 which is coupled to latch input at D as was described with respect to the error condition latch 301 of system 300. The feedback input 302 is provided to OR gate 403 along with the output of OR gate 404 which receives the multiple bit error syndrome line as well as the +UE syndrome line from the ECC system logic. Accordingly, the error condition latch 401 will drive its coupled error indicator element when either a multiple bit error event transpires or when a UE is detected in the ECC system.

The static UE syndrome indication operates in the same manner as previously described with respect to system 300 with the UE detection syndrome serving to activate the error indicator element and the HSS interval disabling logic 315 disabling the timing of the HSS period for the error condition latch 401 until a power-on reset is performed.

Since the HSS interval disabling logic 315 for the UE syndrome is coupled to the error condition latch 401, the single bit error condition latch 301, which in system 400 merely functions to dynamically drive its associated error indicator for a HSS interval, receives the—reset signal 107 output from inverter 106 of the HSS interval timer 100 at the active low C input. Consequently, after the occurrence of a single bit error event, when binary counter 104 has counted to the HSS interval, reset signal 105 is toggled high and through inverter 106 the low logic—reset signal 107 is provided to the active low C input of the error condition latch 301 so as to reset the latch after driving the error indicator element for the HSS interval.

Finally, in order to ensure that the binary counter 104 counts for the full HSS interval upon the occurrence of each error event signaled to system 400, the Q outputs of both error condition latch 301 (Q output signal 302) and error condition latch 401 (Q output signal 402) are combined in OR gate 405 and provided as counter reset signal 307 to the active low reset input of the binary counter 104. As previously described with respect to system 300, this counter reset signal ensures that the binary counter 104 counts a single HSS interval after the system 400 has begun to activate the error indicator element.

Figure 5:
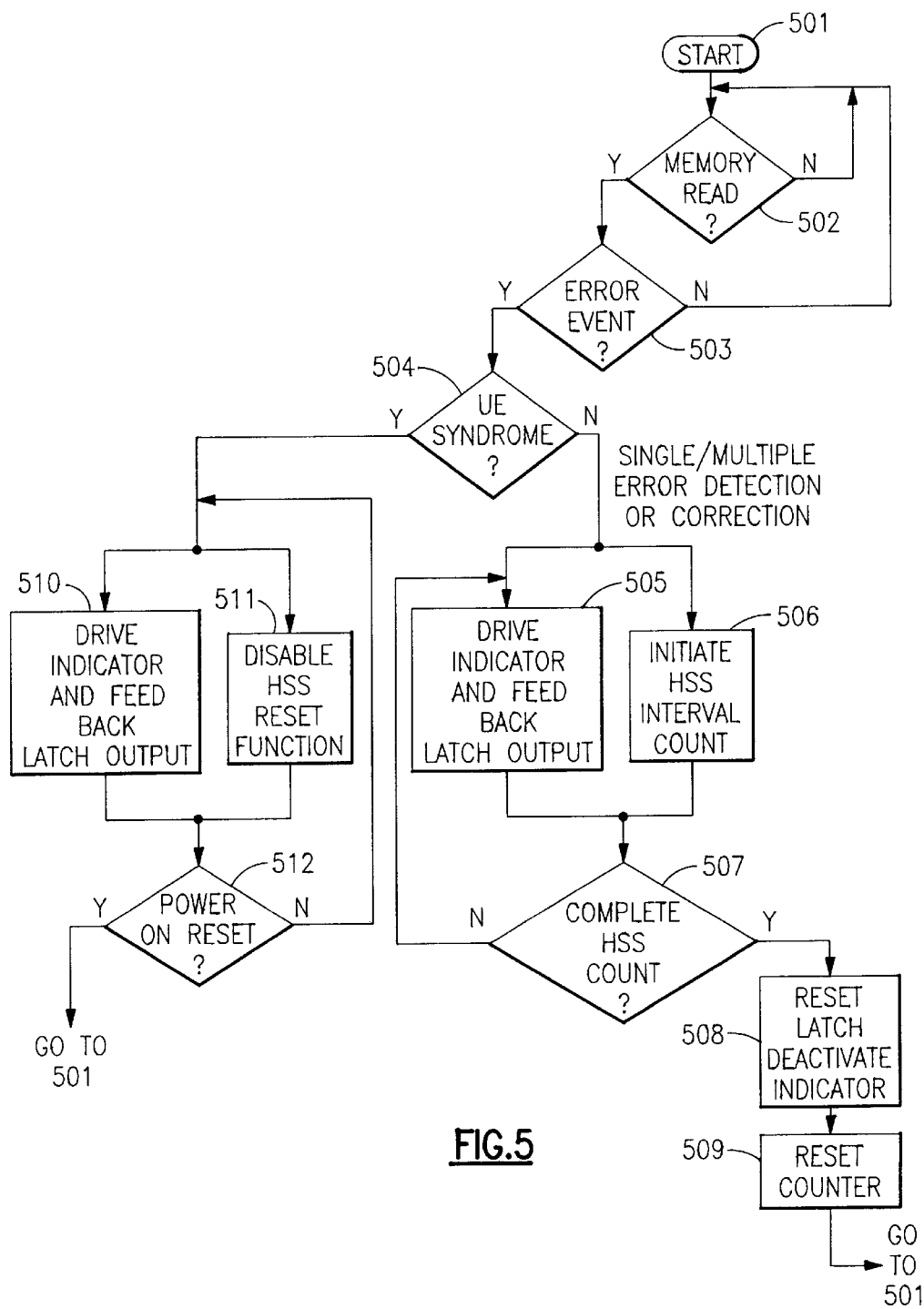
FIG. 5 depicts a high level flow diagram summarizing the steps undertaken to enable HSS indications of sequential error events in an ECC system including dynamic single and/or multiple bit error event indications and static uncorrectable error detection indication, in accordance with the present invention.

Turning now to FIG. 5 a high level flow diagram 500 documents the functionality of the present invention. Starting at start block 501, the process proceeds to decision point 502 wherein it is determined via the memory read determination logic 314 whether a memory read operation is occurring. If a memory read operation is not occurring the process loops back to 502, if a read is occurring the process continues through to decision point 503.

At decision point 503 it is determined by operation of the error event detection and communication logic 313 whether an error event has occurred within the ECC system (it will be recalled that a single bit error syndrome which may be alone as in system 400 or combined in OR 312 with the UE syndrome signal if applicable in system 300 and multiple bit error syndrome signal which is combined in OR gate 404 with the UE syndrome signal if applicable in system 400 serve as the inputs for this logic unit).

If an error event has not occurred we loop back to determine the next memory read cycle at decision point 502. If an error event has been detected we proceed to decision point 504 wherein it is determined whether a UE syndrome has been detected.

If a UE detection syndrome is not presented, the error event is a single bit or multiple bit error event which may include error detection and/or error correction by the ECC system. In this situation we traverse the "no" branch of decision point 504 to concurrent execution steps 505 and 506. In execution step 505 the error event signal is driven through the error condition latch (301 or 401) to activate the error indicator element while the feedback path latches the output signal (302 or 402) of the latch back to the input through the OR gate (303 or 403). Concurrently in step 506 the HSS interval timer 100 begins to accumulate a count of CBR refresh pulses in binary counter 104.

At decision point 507 it is determined whether the HSS binary counter 104 is full. If the counter is not full, we loop back to concurrent execution of steps 505 and 506, and if the counter is full, the process continues to step 508 at which the error condition latch receives the reset signal (either reset 105 if the latch needs to couple to the HSS interval disabling logic for the UE detection syndrome or—reset 107 if the latch does not). At this point the latch is reset and the indicator element deactivated.

Finally, at step 509 after the latch has been reset and its output signal (302 or 402) transitions low, the binary counter 104 is reset to a zero count in preparation of the HSS interval timing of a subsequent error event, and control is looped back to the start block 501.

If at decision point 504 it is alternatively determined that a UE syndrome has been detected, we traverse the "yes" branch to concurrent execution steps 510 and 511. At step 510 the error event signal is driven through the error event detection and communication logic 313 to the error condition latch (301 or 401) to activate the error indicator element while the feedback path latches the output signal (302 or 402) of the latch back to the input through the OR gate (303 or 403). Concurrently, at step 511 the HSS interval disabling logic 315 provides logic to disable the resetting of the error condition latch (301 or 401) thereby negating the effect of the counting undertaken by the binary counter 104 included in the HSS interval timer 100.

At step 512 it is determined whether a power-on reset has been performed. If not, we loop back to concurrent execution of steps 510 and 511, and if so, the UE latch 309 outputs a 1 which re-enables the resetting of the error condition latch restoring the functionality of the HSS interval timer 100. Control is thereafter passed back to the start block 501.

While the foregoing detailed description of the invention illustrates embodiments for accommodating error control systems including UE detection logic, it will be readily appreciated by those of skill in the art that the invention as illustrated will additionally accommodate ECC systems for single and/or multiple error control which have no such UE detection facilities. In such instances, whether multiple error indicator elements are to be separately activated to indicate different types of error events (i.e. single bit/multiple bit, or single bit/double bit/triple bit etc.), or a single error indicator element is activated to indicate the error events within an ECC system, the implementation will be substantially identical to the implementation of error condition latch 301 and its associated logic as illustrated in system 400. In other words, the HSS interval disabling logic 315 will be omitted and the—reset signal 107 will drive the active low clear input of the latch.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention defined in the following claims, which should be construed so as to maintain the proper protection for the invention first disclosed.

Having thus described my invention in detail, what I claim as new and desire to protect by Letters Patent is as follows:

1. A method for automatically providing sequential indications of one or more temporally sequential error events occurring within a error control logic system coupled to a memory system, each of said indications corresponding to the occurrence of one of said error events, the method comprising the steps of:

A. indicating the occurrence of a memory read operation;
   B. determining the presence of any one of said error events within the error correction logic system during the indicated memory read operation;
   C. activating an error indication element for a predetermined time interval in response to the determined presence of the error event; and
   D. repeating steps A—C for each of the one or more sequential error events.

2. A method according to claim 1 wherein said predetermined time interval is a human sensorially significant time interval.

3. A method according to claim 2 wherein the human sensorially significant interval is a visually significant interval and the error indication element produces a visual indication.

4. A method according to claim 1 further including the steps of:

C1. initiating a counter to count said predetermined time interval;
   C2. providing an indication from said counter at the conclusion of the counting of the predetermined time interval; and
   C3. deactivating the error indication element in response to said indication from said counter.

5. A method according to claim 4 further including the step of:

resetting the counter in response to the deactivation of the error indication element.

6. A method according to claim 1 wherein the one or more temporally sequential error events represent the detection or correction of single bit or multiple bit errors by the error control logic system.

7. A method according to claim 6 wherein the one or more temporally sequential error events may further represent the detection of an uncorrectable error and if the error event determined to be present in step B represents the detection of an uncorrectable error, the activating of the error indication element in step C is enabled for an undetermined time interval.

8. A method according to claim 7 wherein if the error event determined to be present in step B represents the detection of said uncorrectable error, the error indication element must be manually disabled.

9. A method according to claim 6 wherein one or more error indication elements are provided and wherein the activating step C includes activating one of the one or more error indication elements corresponding to the number of bit errors detected or corrected by the error event determined to be present in determining step B.

10. A method according to claim 1 wherein the indicating step A further includes the steps of:

A1. detecting the occurrence of the memory read operation;
    A2. delaying the indicating of the occurrence of the memory read operation for a predetermined delay time period; and
    A3. indicating the occurrence of the memory read operation after the predetermined delay time period.

11. A method according to claim 10 wherein the predetermined delay time period is at least as long as the amount of time required for the memory read operation combined with the amount of time required for the detection of any one of said error events within the error correction logic system.

12. An apparatus for automatically providing sequential indications of one or more temporally sequential error events occurring within a error control logic system coupled to a memory system, each of said indications corresponding to the occurrence of one of said error events, the apparatus comprising:

a read operation detection logic capable of coupling to the memory system for detecting and indicating the occurrence of memory read operations;
   an error event detection and communication logic capable of coupling to said error control logic system for detecting and communicating the occurrence of said error events; and
   a driver unit coupled to said read operation detection logic for receiving said indications of said memory read operations, said driver unit further coupled to said error event detection and communication logic for sampling communications of the occurrence of the error events, said driver unit capable of coupling to an error indication element for sequentially activating the error indication element for a predetermined time interval upon sampling the communication of the occurrence of any one of said error events after receiving any one of said indications.

13. An apparatus according to claim 12 wherein the predetermined time interval is a human sensorially significant time interval.

14. An apparatus according to claim 13 wherein the human sensorially significant interval is a visually significant interval and the error indication element produces a visual indication.

15. An apparatus according to claim 12 further comprising:

a counter to count the predetermined time interval, said counter providing a reset signal to said driver unit at the conclusion of the counting of the predetermined time interval for causing the driver unit to deactivate the activated error indication element after the predetermined time interval.

16. An apparatus according to claim 15 wherein the counter counts a sequence of refresh pulses for said memory system.

17. An apparatus according to claim 15 wherein the counter is reset in response to the deactivation of the error indication element.

18. An apparatus according to claim 12 wherein the one or more temporally sequential error events represent the detection or correction of single bit or multiple bit errors by the error control logic system.

19. An apparatus according to claim 18 wherein the one or more temporally sequential error events may further represent the detection of an uncorrectable error and wherein if the error event detection and communication logic detects and communicates the occurrence of an uncorrectable error, the driver unit activates the error indication element for an undetermined time interval.

20. An apparatus according to claim 19 wherein if the error event detection and communication logic detects and communicates the occurrence of said uncorrectable error, the error indication element must be manually disabled.

21. An apparatus according to claim 18 wherein one or more error indication elements are provided and wherein each of the driver units activates one of the one or more error indication elements corresponding to the number of bit errors detected or corrected in the error control logic system as detected and communicated by said error event detection and communication logic.

22. An apparatus according to claim 12 wherein the read operation detection logic further includes delay means for delaying the indicating of the occurrence of memory read operations for a predetermined delay time period after said memory read operations have been detected.

23. An apparatus according to claim 22 wherein the predetermined delay time period is at least as long as the amount of time required for the memory read operation combined with the amount of time required for the detection of any one of said error events within the error correction logic system.

* * * * *